(12) United States Patent
Xu

(10) Patent No.: US 10,927,273 B2
(45) Date of Patent: Feb. 23, 2021

(54) COMPOSITION INCLUDING POLYESTER RESIN AND METHOD OF USING THE SAME

(71) Applicant: 3M INNOVATIVE PROPERTIES COMPANY, St. Paul, MN (US)

(72) Inventor: Ruijian Xu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 103 days.

(21) Appl. No.: 15/921,329

(22) Filed: Mar. 14, 2018

(65) Prior Publication Data
US 2018/0265735 A1 Sep. 20, 2018

Related U.S. Application Data

(60) Provisional application No. 62/471,047, filed on Mar. 14, 2017.

(51) Int. Cl.
| | | |
|---|---|---|
| *C09D 167/07* | (2006.01) | |
| *C09D 7/65* | (2018.01) | |
| *C09D 7/63* | (2018.01) | |
| *C09D 167/06* | (2006.01) | |
| *C09D 5/34* | (2006.01) | |
| *C08L 67/06* | (2006.01) | |
| *C08L 63/10* | (2006.01) | |
| *C09D 7/20* | (2018.01) | |
| *C09D 163/10* | (2006.01) | |
| *C08L 67/07* | (2006.01) | |
| *C08K 3/34* | (2006.01) | |
| *C08K 5/06* | (2006.01) | |
| *C08K 3/013* | (2018.01) | |
| *C08K 5/17* | (2006.01) | |
| *C08K 5/00* | (2006.01) | |
| *C08K 3/26* | (2006.01) | |
| *C08K 5/16* | (2006.01) | |
| *C08K 3/22* | (2006.01) | |
| *C08K 5/14* | (2006.01) | |
| *C08K 5/36* | (2006.01) | |
| *C08K 3/36* | (2006.01) | |
| *C08K 3/40* | (2006.01) | |

(52) U.S. Cl.
CPC ............ *C09D 167/07* (2013.01); *C09D 5/34* (2013.01); *C09D 7/63* (2018.01); *C09D 7/65* (2018.01); *C09D 167/06* (2013.01); *C08K 3/013* (2018.01); *C08K 3/22* (2013.01); *C08K 3/26* (2013.01); *C08K 3/34* (2013.01); *C08K 3/346* (2013.01); *C08K 3/36* (2013.01); *C08K 3/40* (2013.01); *C08K 5/00* (2013.01); *C08K 5/0025* (2013.01); *C08K 5/06* (2013.01); *C08K 5/14* (2013.01); *C08K 5/16* (2013.01); *C08K 5/17* (2013.01); *C08K 5/36* (2013.01); *C08K 2003/2227* (2013.01); *C08K 2003/265* (2013.01); *C08L 63/10* (2013.01); *C08L 67/06* (2013.01); *C08L 67/07* (2013.01); *C08L 2207/322* (2013.01); *C09D 7/20* (2018.01); *C09D 163/10* (2013.01)

(58) Field of Classification Search
None
See application file for complete search history.

(56) References Cited

U.S. PATENT DOCUMENTS

| | | | | |
|---|---|---|---|---|
| 3,883,612 A | * | 5/1975 | Pratt ...................... | C08L 67/06 525/170 |
| 4,289,684 A | * | 9/1981 | Kallaur .................. | C08G 18/68 523/527 |
| 4,409,360 A | | 10/1983 | Hefner, Jr. | |
| 4,443,580 A | * | 4/1984 | Hefner, Jr. ......... | C08F 299/0478 428/425.6 |
| 4,626,570 A | * | 12/1986 | Gardner ............... | C08G 63/553 525/12 |
| 4,745,141 A | | 5/1988 | Akiyama | |
| 4,777,196 A | * | 10/1988 | Hefner, Jr. .............. | C04B 26/18 523/518 |
| 4,980,414 A | | 12/1990 | Naton | |
| 5,068,125 A | | 11/1991 | Meixner | |
| 5,120,785 A | | 6/1992 | Walker | |
| 5,248,742 A | * | 9/1993 | McGarry ................ | C08L 63/00 525/531 |

(Continued)

FOREIGN PATENT DOCUMENTS

| | | |
|---|---|---|
| EP | 0322808 | 7/1989 |
| EP | 0783026 | 7/1997 |

(Continued)

OTHER PUBLICATIONS

"Jeffamine Polyetheramines—Technical Bulletin" (2012). (Year: 2012).*
"The Jeffamine Polyetheramines" (2007). (Year: 2007).*

*Primary Examiner* — Vivian Chen
(74) *Attorney, Agent, or Firm* — Kathleen B. Gross

(57) ABSTRACT

The composition includes a polymeric resin having at least one α,β-unsaturated ester group, a vinyl aromatic compound having at least one vinyl substituent on an aromatic ring, and an amino- or mercapto-substituted compound represented by formula $(HD)_{1-4}$-R. Each D is independently —S— or —N(H)— and R is a monovalent alkyl, alkenyl, or polyalkyleneoxy or a multivalent alkylene, alkenylene, or polyalkyleneoxy, wherein the alkyl, alkenyl, alkylene, or alkenylene are each interrupted by at least two —O—, —N(H)—, —N(H)—C(O)—, —S—C(O)—, or —O—C(O)— groups or a combination thereof. A method of repairing a damaged surface using the composition is also described.

19 Claims, No Drawings

(56) References Cited

U.S. PATENT DOCUMENTS

| | | | |
|---|---|---|---|
| 5,360,863 A | 11/1994 | Meixner | |
| 5,373,036 A | 12/1994 | Parish | |
| 5,393,849 A * | 2/1995 | Srinivasan | C08F 299/04 525/420 |
| 5,395,866 A * | 3/1995 | Ross | C08F 290/141 523/512 |
| 5,456,947 A | 10/1995 | Parish | |
| 5,492,668 A * | 2/1996 | Smeal | C08F 283/01 264/308 |
| 5,534,211 A * | 7/1996 | Smeal | C08F 283/01 264/308 |
| 6,037,408 A | 3/2000 | Weber | |
| 6,063,864 A | 5/2000 | Mathur | |
| 6,165,557 A | 12/2000 | Blum | |
| 6,384,151 B1 * | 5/2002 | Matsukawa | C08F 283/01 523/527 |
| 6,515,071 B1 * | 2/2003 | Riley | C08G 63/553 525/44 |
| 7,326,752 B2 | 2/2008 | McAlvin | |
| 7,396,882 B2 | 7/2008 | Hewitt | |
| 8,034,852 B2 | 10/2011 | Janssen | |
| 8,372,926 B2 | 2/2013 | Palmese | |
| 8,906,999 B2 | 12/2014 | Hsu | |
| 9,221,981 B2 | 12/2015 | Adams | |
| 2002/0055597 A1 * | 5/2002 | Hsu | C08G 63/676 525/442 |
| 2002/0072574 A1 * | 6/2002 | Hsu | C08L 67/06 525/438 |
| 2003/0057406 A1 * | 3/2003 | Yang | C08K 5/0008 252/609 |
| 2004/0068088 A1 * | 4/2004 | Loza | C08G 63/20 528/272 |
| 2004/0170850 A1 * | 9/2004 | Nava | B29C 70/50 428/480 |
| 2010/0093911 A1 * | 4/2010 | Guha | C08F 283/00 524/433 |
| 2012/0258424 A1 * | 10/2012 | Falsafi | A61K 6/20 433/90 |
| 2012/0295214 A1 * | 11/2012 | Wang | A61K 6/30 433/24 |
| 2014/0213686 A1 * | 7/2014 | Falsafi | A61C 5/64 522/181 |
| 2017/0152337 A1 | 6/2017 | Piestert | |
| 2020/0199400 A1 * | 6/2020 | Xu | C08G 63/52 |

FOREIGN PATENT DOCUMENTS

| | | |
|---|---|---|
| EP | 1333041 | 8/2003 |
| EP | 1403298 | 3/2004 |
| GB | 2284424 | 6/1995 |
| JP | 3021493 B2 | 3/2000 |
| JP | 3146598 B2 | 3/2001 |
| JP | 3461075 B2 | 10/2003 |
| JP | 2005-255937 | 9/2005 |
| WO | WO 1995-019379 | 7/1995 |

* cited by examiner

COMPOSITION INCLUDING POLYESTER RESIN AND METHOD OF USING THE SAME

This Application claims benefit of Provisional Application No. 62/471,047, filed Mar. 14, 2017.

BACKGROUND

Automobile body repair is often carried out with a body repair compound, also called body filler. A body repair compound can include a thermosetting resin, fillers, promoters, and other additives that are mixed with a catalyst to facilitate cross-linking at room temperature. After mixing, a technician spreads the body filler onto a damaged surface, allows the body filler to harden, and then sands the hardened body filler to conform to the desired surface contour. The process can be repeated two or more times until the damaged area of the vehicle is sufficiently filled, and the contour of the original surface is matched.

A body filler composition including an amine adduct prepared by reaction of a primary amine and bi-functional epoxy resin in a polyester resin composition is disclosed in GB 2284424, published Jun. 7, 1995. Another body filler composition including a dicyclopentadiene-modified unsaturated polyester resin is described in Int. Pat. Appl. Pub. No. WO 95/19379 (Ruggeberg).

SUMMARY

While body fillers including unsaturated polyester resins typically adhere securely to steel body parts under dry conditions, they often have unsatisfactory adhesion to a variety of substrates such as galvanized steel (e.g., hot dipped galvanized steel). Such standard body fillers also do not adhere well to many substrates under wet conditions. Thus, the cured body fillers do not impart water and corrosion resistance to many substrates. To improve dry adhesion on galvanized steel, adhesion promoters can be used. However, adhesion promoters have not been shown to improve wet adhesion, and in some body fillers, the addition of an adhesion promoter may negatively impact wet adhesion. There is a need for a body filler that provides strong adhesion, easy sanding, and water- and corrosion-resistance.

In one aspect, the present disclosure provides a composition including a polymeric resin having at least one $\alpha,\beta$-unsaturated ester group, a vinyl aromatic compound having at least one vinyl substituent on an aromatic ring, and an amino- or mercapto-substituted compound represented by formula $(HD)_{1-4}$-R. In formula $(HD)_{1-4}$-R, each D is independently —S— or —N(H)— and R is a monovalent alkyl or alkenyl or a multivalent alkylene or alkenylene each of which is interrupted by at least two —O—, —N(H)—, —N(H)—C(O)—, —S—C(O)—, or —O—C(O)— groups or a combination thereof.

In another aspect, the present disclosure provides a cured composition prepared from such a composition.

In another aspect, the present disclosure provides a method of repairing a damaged surface. The method includes combining the composition described above with at least one of an organic peroxide or organic hydroperoxide, applying the composition comprising the organic peroxide or hydroperoxide to the damaged surface; and curing the composition on the damaged surface.

In another aspect, the present disclosure provides an article including a cured composition on a surface. The cured composition includes a polyester crosslinked with a vinyl aromatic compound comprising at least one vinyl substituent on an aromatic ring and reacted with a compound represented by formula $(HD)_{1-4}$-R. In formula $(HD)_{1-4}$-R, each D is independently —S— or —N(H)— and R is a monovalent alkyl or alkenyl or a multivalent alkylene or alkenylene each of which is interrupted by at least two —O—, —N(H)—, —N(H)—C(O)—, —S—C(O)—, or —O—C(O)— groups or a combination thereof.

Typically and advantageously, the composition according to present disclosure quickly develops adhesion to a surface to which it is applied. The cured composition according to the present disclosure at least one of provides better lap shear adhesion to a surface, provides better corrosion resistance to a surface, or is more easily sanded than a comparative composition, wherein the comparative cured composition is the same as the cured composition except the in the comparative cured composition the unsaturated polyester resin is not reacted with the compound represented by formula $(HD)_{1-4}$-R.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

"Alkyl group", "alkenyl group" and the prefix "alk-" are inclusive of both straight chain and branched chain groups. In some embodiments, alkyl groups have up to 30 carbons (in some embodiments, up to 20, 15, 12, 10, 8, 7, 6, or 5 carbons) unless otherwise specified.

"Alkylene" is the multivalent (e.g., divalent or trivalent) form of the "alkyl" groups defined above. "Alkenylene" is the multivalent (e.g., divalent or trivalent) form of the "alkenyl" groups defined above.

"Arylalkylene" refers to an "alkylene" moiety to which an aryl group is attached. "Alkylarylene" refers to an "arylene" moiety to which an alkyl group is attached.

The phrase "interrupted by at least one —O— group", for example, with regard to an alkyl, alkenyl, alkylene, or alkenylene group refers to having part of the alkyl or alkylene on both sides of the —O— group. For example, —$CH_2CH_2$—O—$CH_2$—$CH_2$— is an alkylene group interrupted by an —O—. This definition applies to the other functional groups recited herein (e.g., —N(H)—, —N(H)—C(O)—, etc.).

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

All numerical ranges are inclusive of their endpoints and non-integral values between the endpoints unless otherwise stated (e.g., 1 to 5 includes 1, 1.5, 2, 2.75, 3, 3.80, 4, 5, etc.).

DETAILED DESCRIPTION

The composition according to the present disclosure includes a polymeric resin having at least one $\alpha,\beta$-unsaturated ester group. Unsaturated $\alpha,\beta$-unsaturated ester groups have the formula C=C—C(O)—O—. The terminal carbon of the double bond may be bonded to two hydrogen atoms, making it a terminal olefin group, or one or two other carbon atoms, making it an internal olefin. The terminal oxygen of the ester group is typically bonded to a carbon atom in the resin.

The composition according to the present disclosure can include an unsaturated polyester resin. Unsaturated polyester resins include a polyester generally formed by a polycondensation reaction of an unsaturated dicarboxylic acid or an anhydride thereof with a multifunctional hydroxy compound. Unsaturated dicarboxylic acids useful for the unsaturated polyester resin typically include $\alpha,\beta$-unsaturated acids and anhydrides thereof (e.g., maleic anhydride, maleic acid, fumaric acid, itaconic acid, citraconic acid, and citraconic anhydride). Other dicarboxylic acids or equivalents can also be included in the preparation of the unsaturated polyester resin. Examples include saturated aliphatic dicarboxylic acids having 4 to 10 carbon atoms such as succinic acid, adipic acid, sebacic acid and/or their anhydrides; cycloaliphatic dicarboxylic acids or dicarboxylic acid anhydrides having 8 to 10 carbon atoms such as tetrahydrophthalic acid, hexahydrophthalic acid, norbornene dicarboxylic acid or their anhydrides; and aromatic dicarboxylic acids or dicarboxylic acid anhydrides having 8 to 12 carbon atoms such as phthalic acid, phthalic anhydride, isophthalic acid or terephthalic acid. Examples of hydroxy compounds useful for making unsaturated polyester resins include 1,2-propanediol, 1,3-propanediol, dipropylene glycol, diethylene glycol, ethylene glycol, 1,3-butanediol, 1,4-butane diol, neopentyl glycol, triethylene glycol, tripropylene glycol, and polyethylene glycols.

The unsaturated polyester resin useful for practicing the present disclosure can comprise a dicyclopentadiene-modified unsaturated polyester resin. Dicyclopentadiene has been used to modify unsaturated polyester resins in various ways. For example, cracking dicyclopentadiene (e.g., heating at a temperature of at least 140° C.) forms cyclopentadiene, which can undergo a Diels-Alder reaction with maleic acid or maleic anhydride to form nadic acid or nadic anhydride groups in the polyester backbone. In another example, maleic acid can react with one or fewer equivalents of dicyclopentadiene to form a dicylopentenyl monoester of maleic acid. The reaction is typically carried out at a temperature lower than 140° C. to avoid cracking the dicyclopentadiene. The dicylopentenyl monoester can then be combined with a dihydroxy compound and optionally an unsaturated dicarboxylic acid or an anhydride thereof to provide a dicylopentenyl-end-capped polyester resin.

Mixtures of different unsaturated polyester resins may be useful in the composition according to the present disclosure. For example, a mixture of unsaturated polyesters made from different unsaturated dicarboxylic acids or anhydrides thereof and/or different dihydroxy compounds can be useful. Mixtures of dicyclopentadiene-modified unsaturated polyester resins (in some embodiments, dicylopentenyl-end-capped polyester resin) and polyester resins not modified with dicylopentadiene are also useful, for example, to provide a cured composition with a desirable modulus.

Unsaturated polyester resins useful for practicing the present disclosure can have a wide variety of molecular weights. In some embodiments, the unsaturated polyester resins can have weight average molecular weights in a range from 500 grams per mole to 20,000 grams per mole, 1000 grams per mole to 10,000 grams per mole, or 1000 grams per mole to 5,000 grams per mole, as measured by gel permeation chromatography using a polystyrene standards.

Illustrative unsaturated polyester based compositions are described in U.S. Pat. No. 5,456,947 (Parish et al.); U.S. Pat. No. 4,980,414 (Naton); and U.S. Pat. No. 5,373,036 (Parish et al.). Other illustrative unsaturated polyester based compositions are described in Int. Pat. Appl. Pub. No. WO 95/19379 (Ruggeberg). Unsaturated polyester resins useful for practicing the present disclosure can be obtained from commercial sources, for example, Reichhold LLC, Durham, N.C.; Polynt Composites, USA, Inc., North Kansas City, Mo.; AOC, LLC, Collierville, Tenn.; DSM Resins U.S., Inc., Augusta, Ga.; Ashland Specialty Chemical Co., Columbus, Ohio; Bayer Material Science LLC, Pittsburgh, Pa.; Interplastic Corporation, St. Paul, Minn.; and Deltech Corporation, Baton Rouge, La.

The composition according to the present disclosure can include a vinyl ester resin. As would be understood by a person of ordinary skill in the art, a vinyl ester is a resin produced by the esterification of an epoxy resin with an unsaturated monocarboxylic acid. Epoxy vinyl ester resins are typically prepared, for example, by reacting a vinyl monocarboxylic acid (e.g., acrylic acid, methacrylic acid, ethacrylic acid, halogenated acrylic or methacrylic acids, cinnamic acid, and combinations thereof) and an aromatic polyepoxide (e.g., a chain-extended diepoxide or novolac epoxy resin having at least two epoxide groups) or a monomeric diepoxide. Useful epoxy vinyl ester resins typically have at least two end groups represented by formula —$CH_2$—CH(OH)—$CH_2$—O—C(O)—C(R")=CH(R'), wherein R" is hydrogen, methyl, or ethyl, wherein the methyl or ethyl group may optionally be halogenated, wherein R' is hydrogen or phenyl, and wherein the terminal $CH_2$ group is linked directly or indirectly to the aromatic group described below (e.g., through a phenolic ether functional group). The aromatic polyepoxide or aromatic monomeric diepoxide typically contains at least one (in some embodiments, at least 2, in some embodiments, in a range from 1 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Examples of aromatic epoxy resins useful for reaction with vinyl monocarboxylic acids include novolac epoxy resins (e.g., phenol novolacs, ortho-, meta-, or para-cresol novolacs or combinations thereof), bisphenol epoxy resins (e.g., bisphenol A, bisphenol F, halogenated bisphenol epoxies, and combinations thereof), resorcinol epoxy resins, and tetrakis phenylolethane epoxy resins. Examples of aromatic monomeric diepoxides useful for reaction with vinyl monocarboxylic acids include the diglycidyl ethers of bisphenol A and bisphenol F and mixtures thereof. In some embodiments, bisphenol epoxy resins, for example, may be chain extended to have any desirable epoxy equivalent weight. In some embodiments, the aromatic epoxy resin (e.g., either a bisphenol epoxy resin or a novolac epoxy resin) may have an epoxy equivalent weight of at least 140, 150, 200, 250, 300, 350, 400, 450, or 500 grams per mole. In some embodiments, the aromatic epoxy resin may have an epoxy equivalent weight of up to 2500, 3000, 3500, 4000, 4500, 5000, 5500, or 6000 grams per mole. In some embodiments, the aromatic epoxy resin may have an epoxy equivalent weight in a range from 150 to 6000, 200 to 6000, 200 to 5000, 200 to 4000, 250 to 5000, 250 to 4000, 300 to 6000, 300 to 5000, or 300 to 3000 grams per mole.

Several aromatic epoxy vinyl ester resins useful for the composition of the present disclosure are commercially available. For example, epoxy diacrylates such as bisphenol A epoxy diacrylates and epoxy diacrylates diluted with other acrylates are commercially available, for example, from Cytec Industries, Inc., Smyrna, Ga., under the trade designation "EBECRYL". Aromatic epoxy vinyl ester resins such as novolac epoxy vinyl ester resins diluted with styrene are available, for example, from Ashland, Inc., Covington, Ky., under the trade designation "DERAKANE" (e.g., "DERAKANE 470-300") and from Interplastic Corporation, St. Paul, Minn., under the trade designation "CoREZYN" (e.g., "CoREZYN 8730" and "CoREZYN 8770").

A combination of unsaturated polyester resins and vinyl ester resins may be useful in the composition according to the present disclosure.

The composition according to the present disclosure and/or useful for practicing the present disclosure includes a vinyl aromatic compound comprising at least one vinyl substituent on an aromatic ring. The aromatic ring is typically a benzene ring or a naphthalene ring. In addition to the vinyl substituent, the vinyl aromatic compound may also include other substituents (e.g., alkyl, alkoxy, or halogen). Examples of suitable vinyl aromatic compounds include styrene, alpha-methyl styrene, p-methyl styrene, p-tert-butyl styrene, chlorostyrene, dichlorostyrene, p-ethoxy styrene, p-propoxy styrene divinyl benzene, and vinyl naphthalene. In some embodiments, the vinyl aromatic compound is styrene.

Compositions according to the present disclosure typically have from 20% by weight to 50% by weight of the vinyl aromatic compound and 45% to 79% by weight of the polymeric resin. Commercially available unsaturated polyester resins and vinyl ester resins typically include 20% by weight to 50% by weight of a vinyl aromatic compound, typically styrene. In some embodiments, compositions according to the present disclosure have from 25% by weight to 45% by weight of the vinyl aromatic compound and 55% to 75% by weight of the polymeric resin. These percentages are based on the total weight of polymeric resin, vinyl aromatic compound, and amino- or mercapto-substituted compound.

The composition according to the present disclosure and/or useful for practicing the present disclosure includes an amino- or mercapto-substituted compound represented by formula $(HD)_{1-4}$-R. In this formula, each D is independently —S— or —N(H)—. In some embodiments, D is —N(H)—, and the compound represented by formula $(HD)_{1-4}$-R has at least one amino group. In some embodiments, when more than one DH group is present each one is either —S— or —N(H)—. In formula $(HD)_{1-4}$-R, R is a monovalent alkyl, alkenyl, or polyalkyleneoxy or a multivalent alkylene, alkenylene, or polyalkyleneoxy that is interrupted by at least two ether (i.e., —O—), amine (i.e., —N(H)—), amide (i.e., —N(H)—C(O)—), thioester (i.e., —S—C(O)—), or ester (i.e., —O—C(O)—) groups or a combination thereof. In some embodiments, R is alkenylene that is interrupted by at least one amine (i.e., —N(H)—) and at least one amide (i.e., —N(H)—C(O)—). In some embodiments, R is polyalkyleneoxy with a molecular weight up to 2500, 2000, 1500, 1000, or 500. In the polyalkyleneoxy, the alkylene groups comprise at least one of ethylene or propylene groups.

In some embodiments, the amino- or mercapto-substituted compound represented by formula $(HD)_{1-4}$-R is represented by formula HD-$R^1$-Q-$R^2$, wherein $R^1$ is alkylene that is interrupted by at least one —N(H)— or —O—; Q is —N(H)—C(O)—, —S—C(O)—, or —O—C(O)—; and $R^2$ is alkyl or alkenyl. In some of these embodiments, Q is —N(H)—C(O)— or —O—C(O)—. In some embodiments, Q is a —N(H)—C(O)—. In some embodiments, $R^2$ is alkyl or alkenyl having from 8 to 14, 8 to 13, or 8 to 12 carbon atoms. Compounds of formula HD-$R^1$-Q-$R^2$ can be made, for example, by reaction of a diamine or dithiol with a saturated or unsaturated fatty acid. Diamines and dithiols useful for making these compounds include those described below. Useful compounds of formula HD-$R^1$-Q-$R^2$ include compounds in which D is —N(H)—, $R^1$ is alkylene that is interrupted by at least one —N(H)—, Q is —N(H)—C(O)—, and $R^2$ is alkenyl having 8 to 14 carbon atoms. In some embodiments, the compound represented by formula HD-$R^1$-Q-$R^2$ is $H_2N(CH_2CH_2NH)_4C(O)(CH_2)_7C(H)=C(H)—(CH_2)_3CH_3$. In some embodiments, the compound represented by formula HD-$R^1$-Q-$R^2$ is not $H_2N(CH_2CH_2NH)_4C(O)(CH_2)_7C(H)=C(H)—(CH_2)_3CH_3$.

Other useful compounds of formula $(HD)_{1-4}$-R include multifunctional compounds having 2 to 4 DH groups and in which R is alkylene that is interrupted by at least two —O— or —O—C(O)—. In some embodiments, the compound of formula $(HD)_{1-4}$-R is a polyethylenepolyamine (e.g., diethylenetriamine, triethylenetetramine, or tetraethylenepentamine) or a polyether diamine with a molecular weight up to 2500, 2000, 1500, 1000, or 500. Useful polyether amines are commercially available, for example, under the trade designation "JEFFAMINE" from Huntsman Chemical, The Woodlands, Tex., and from BASF, Florham Park, N.J. The molecular weights are typically provided by the manufacturer. In some embodiments, the compound represented by formula $(HD)_{1-4}$-R is a polyetherdiamine having a molecular weight of at least 1000 grams per mole. In some embodiments, the compound represented by formula $(HD)_{1-4}$-R is $HSCH_2CH_2OCH_2CH_2OCH_2CH_2SH$. In some embodiments, the compound represented by formula $(HD)_{1-4}$-R is pentaerythritol tetra(3-mercaptopropionate), trimethylolpropane tris(3-mercaptoproionate), and ethylene glycol bis (3-mercaptopropionate). The compound represented by formula $(HD)_{1-4}$-R may also be "POLYTHIOL QE-340M" curing agent from Toray Fine Chemicals, Co., Ltd., Tokyo, Japan.

Compositions according to the present disclosure typically include the amino- or mercapto-substituted compound represented by formula $(HD)_{1-4}$-R in an amount of up to 10% by weight based on the total of polymeric resin, vinyl aromatic compound, and amino- or mercapto-substituted compound. In some embodiments, the composition according to the present disclosure includes the amino- or mercapto-substituted compound represented by formula $(HD)_{1-4}$-R in an amount in a range from 0.1% by weight to 5% by weight, 0.2% by weight to 5% by weight, 0.5% by weight to 4% by weight, or 1% by weight to 3% by weight based on the total of polymeric resin, vinyl aromatic compound, and amino- or mercapto-substituted compound.

The composition according to the present disclosure and/or useful for practicing the present disclosure can include one or more radical inhibitors. Examples of useful classes of radical inhibitors include phenolic compounds, stable radicals like galvinoxyl and N-oxyl based compounds, catechols, and phenothiazines Examples of useful radical inhibitors that can be used in composition according to the present disclosure include 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, naphthoquinone, 1-oxyl-2,2,6,6-tetramethylpiperidine, 1-oxyl-2,2,6,6-tetramethylpiperidine-4-ol, 1-oxyl-2,2,6,6-tetramethylpiperidine-4-one, 1-oxyl-2,2,6,6-tetramethyl-4-carboxyl-piperidine, 1-oxyl-2,2,5,5-tetramethylpyrrolidine, 1-oxyl-2,2,5,5-tetramethyl-3-carboxylpyrrolidine, aluminium-N-nitrosophenyl hydroxylamine, diethylhydroxylamine, phenothiazine and/or derivatives or combinations of any of these compounds. Any useful amount of radical inhibitor may be included in the composition disclosed herein. In some embodiments, the amount of radical inhibitor in the composition according to the present disclosure is in the range of from 0.0001% to 10% (in some embodiments, 0.001% to 1%) by weight, based on the total weight of resin, vinyl aromatic compounds, and amino- or mercapto-functional compound.

The composition according to the present disclosure may also include a filler. In some embodiments, the composition according to the present disclosure includes at least one of ceramic beads, polymer beads, silica, hollow ceramic elements, hollow polymeric elements, alumina, zirconia, mica, dolomite, wollastonite, fibers, talc, calcium carbonate, sodium metaborate, or clay. Such fillers, alone or in combination, can be present in the composition according to the present disclosure in a range from 10 percent by weight to 70 percent by weight, in some embodiments, 20 percent by weight to 60 percent by weight or 40 percent by weight to 60 percent by weight, based on the total weight of the composition. Silica, alumina, and zirconia, for example, can be of any desired size, including particles having an average size above 1 micrometer, between 100 nanometers and 1 micrometer, and below 100 nanometers. Silica can include nanosilica and amorphous fumed silica, for example. The term "ceramic" refers to glasses, crystalline ceramics, glass-ceramics, and combinations thereof. Hollow ceramic elements can include hollow spheres and spheroids. Examples of commercially available materials suitable for use as the hollow, ceramic elements include glass bubbles marketed by 3M Company, Saint Paul, Minn., as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill. under the trade designation "SIL-CELL" (e.g., grades SIL 35/34, SIL-32, SIL-42, and SIL-43). The hollow, ceramic elements may also be made from ceramics such as alpha-alumina, zirconia, and alumina silicates. In some embodiments, the discrete, hollow, ceramic elements are aluminosilicate microspheres extracted from pulverized fuel ash collected from coal-fired power stations (i.e., cenospheres). Useful cenospheres include those marketed by Sphere One, Inc., Chattanooga, Tenn., under the trade designation "EXTENDOSPHERES HOLLOW SPHERES" (e.g., grades SG, MG, CG, TG, HA, SLG, SL-150, 300/600, 350 and FM-1). Other useful hollow, ceramic spheroids include silica-alumina ceramic hollow spheres with thick walls marketed by Valentine Chemicals of Lockport, La., as ZEEOSPHERES CERAMIC MICROSPHERES in grades N-200, N-200PC, N-400, N-600, N-800, N1000, and N1200. The hollow ceramic elements may have one of a variety of useful sizes but typically has a maximum dimension, or average diameter, of less than 10 millimeters (mm), more typically less than one mm. In some embodiments, the hollow ceramic elements have a maximum dimension in a range from 0.1 micrometer to one mm, from one micrometer to 500 micrometers, from one micrometer to 300 micrometers, or even from one micrometer to 100 micrometers. The mean particle size of the hollow, ceramic elements may be, for example, in a range from 5 to 250 micrometers (in some embodiments from 10 to 110 micrometers, from 10 to 70 micrometers, or even from 20 to 40 micrometers). As used herein, the term size is considered to be equivalent with the diameter and height, for example, of glass bubbles. In some embodiments, each of the fillers in the composition according to the present disclosure has a mean particle size up to 100 micrometers as described in U.S. Pat. No. 8,034,852 (Janssen et al.).

The composition according to the present disclosure may also include an accelerant, for example, for a peroxide initiator. The selection of accelerant(s) appropriate for use in the composition according to the present disclosure depends, for example, upon selection of the peroxide initiator. Examples of suitable accelerants include thioamides (e.g., thiourea, acyl thiourea, tetramethyl thiourea, diethylthiourea, dibutyl thiourea, ethylene thiourea, trimethyl thiourea, triphenyl thiourea and trioyl thiourea), mercaptobenzimidazole, tertiary amines (e.g., N,N-dialkyl toluidines, where the alkyl group is selected from among methyl, ethyl, hydroxyethyl, hydroxylpropyl, isopropyl and mixtures thereof), trialkyl amines, where alkyl is selected from among ethyl, propyl, and ethyl diethanol, N,N-dialkylanilines (e.g., N,N-dimethylaniline and N,N-diethylaniline), 4,4-bis(dimethylamino) diphenylmethane, and mixtures of any of these. Inorganic materials as well as organic salts may also be useful as accelerants in the composition according to the present disclosure. Examples of suitable inorganic and organometallic accelerants include magnesium, tin, and cobalt salts such as cobalt naphthenate. Mixtures of these accelerants may also be useful, and mixtures any of the organic, inorganic, and organometallic accelerators described above may be useful. In some embodiments, the accelerator is N,N-diisopropanol-p-toluidine, N,N-dihydroxyethyl-p-toluidine; N,N-methylhydroxyethyl-p-toluidine, or a mixture of these. Any useful amount of accelerator may be included in the composition. In some embodiments, an accelerator is included in the composition in an amount up to 2, 1, 0.75, or 0.5 percent by weight, based on the total weight of the composition.

Compositions according to the present disclosure can also include dyes, pigments, rheology modifiers (e.g., fumed silica or clay). Compositions according to the present disclosure can be packaged, for example, as a two-part composition (e.g., body repair composition), wherein a first part comprises the composition including any of the components described above, and a second part comprises a free-radical initiator (e.g., organic peroxide or organic hydroperoxide). The volumetric ratio of the first to second part may be in the range of, e.g., 20:1 or higher, or 25:1 or higher, or 30:1 or higher for unsaturated polyester resins with a peroxide catalyst as an initiator.

Examples of useful organic peroxides and hydroperoxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), and diacylperoxides (e.g., benzoyl peroxide or lauryl peroxide). Other examples of useful organic peroxides include peroxycarbonates (e.g., tert-butylperoxy 2-ethylhexylcarbonate, tert-butylperoxy isopropyl carbonate, or di(4-tert-butylcyclohexyl) peroxydicarbonate) and ketone peroxides (e.g., methyl ethyl ketone peroxide, 1,1-di(tert-butylperoxy) cyclohexane, 1,1-di(tert-butylperoxy)-3,3,5-trimethylcyclohexane, and cyclohexanone peroxide). The organic peroxide may be selected, for example, based on the temperature desired for use of the organic peroxide and compatibility with the polymeric resin desired to be cured. For curing at room temperature, benzoyl peroxide, cumene hydroperoxide, cyclohexanone peroxide, diisopropylbenzene dihydroperoxide, t-butyl monoperoxymaleate, lauryl peroxide, methyl ethyl ketone peroxide, t-butyl hydroperoxide, or mixtures thereof may be useful. Any useful amount of organic peroxide and/or hydroperoxide may be combined with the composition. In some embodiments, at least one of a peroxide or hydroperoxide is combined with the composition in an amount up to 5, 3, 2.5, or 2 percent by weight, based on the total weight of the composition.

For convenience, when adding organic peroxides and hydroperoxides to a composition according to the present disclosure, the peroxide may be used in a formulation (e.g., paste) that also includes a diluent. The diluent can be a plasticizer, mineral spirits, water, or solvent (e.g., N-methyl-2-pyrrolidone, tetrahydrofuran, or ethyl acetate). For example, pastes made from benzoyl peroxide, ketone peroxides (e.g., methyl ethyl ketone peroxide), hydroperoxides (e.g., cumene hydroperoxide), peroxyesters (e.g., t-butyl peroxy-2-ethylhexanoate), and diperoxyketals are all sold commercially.

The free-radical initiator for curing the compositions according to the present disclosure may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for example, from BASF under the trade designation "IRGACURE". The photoinitiator may be selected, for example, based on the desired wavelength for curing and compatibility with the polymeric resin desired to be cured. When photochemical curing of the composition according to the present disclosure is desired, a photoinitiator can be included in the composition according to the present disclosure to make a one-part curable composition. Any useful amount of photoinitiator may be included the composition. In some embodiments, a photoinitiator is included the composition in an amount up to 3, 2.5, 2, or 1 percent by weight, based on the total weight of the composition.

The present disclosure provides a method of repairing a damaged surface. The method includes combining the composition described above in any of its embodiments with an organic peroxide or hydroperoxide, applying the composition comprising the organic peroxide or hydroperoxide to the damaged surface; and curing the composition on the damaged surface.

The present disclosure provides a cured composition made from the curable composition according to any of the above embodiments as well as an article comprising the cured composition on a surface. The cured composition includes a polyester resin crosslinked with a vinyl aromatic compound comprising at least one vinyl substituent on an aromatic ring and reacted with a compound represented by formula $(HD)_{1-4}$-R, wherein D and R are described above in any of their embodiments. While this disclosure is not to be bound by theory, it is believed that the amino or mercapto group in the compound of formula $(HD)_{1-4}$-R undergoes a Michael addition with the α,β-unsaturated ester in the resin to form a secondary amine or a thioether group. Furthermore, it is believed that the at least two —O—, —N(H)—, —N(H)—C(O)—, —S—C(O)—, or —O—C(O)— groups or a combination thereof in the R group of formula $(HD)_{1-4}$-R improve adhesion to the substrate. Also, when more than one DH group or an olefin unsaturation are present in $(HD)_{1-4}$-R, crosslinking of the polymer resin comprising at least one α,β-unsaturated ester group may occur.

One application of compositions according to the present disclosure are curable body repair materials useful in the repair of damaged vehicles and other equipment (e.g., cars, trucks, watercraft, windmill blades, aircraft, recreational vehicles, bathtubs, storage containers, and pipelines). Curable body repair materials can include two reactive components (e.g., a curable polymeric resin and catalyst or initiator) which are mixed together to form the curable body repair material.

In some embodiments of the method of the present disclosure, the damaged surface to be repaired is on at least a portion of a vehicle. Similarly, in some embodiments of the article of the present disclosure, the article is a portion of a vehicle.

The process of repairing dents and other damage using body repair materials can present challenges. For repairing an automobile, for example, a technician typically mixes the two reactive components and then uses a squeegee to spread the repair compound onto the surface of the vehicle to roughly match the contour of the surface. As the curable polymeric resin reacts with the curative or initiator, it hardens to a state where it can be shaped to match the contour of the vehicle before it was damaged. During this hardening process, the repair compound typically transitions from a state of soft, gelled material to a state of moderately hard material that is relatively easy to shape with an abrasive article (e.g., sandpaper) to a state of hard material. Body repair materials typically require handling in a relatively narrow time window. Premature sanding of body repair material before it has reached a critical amount of cure results in sandpaper becoming plugged reducing its effectiveness, the surface of the body repair material becoming rough, and sometimes the body repair material peeling away from the surface of the vehicle. If this situation occurs, then typically the body repair material has to be partially removed (usually by sanding) such that another layer of body repair material can be put on top and properly shaped. Furthermore, it is challenging for body repair materials to adhere well to a variety of common repair surfaces (e.g., aluminum, galvanized steel, E-coats, primers, and paints).

The composition according to the present disclosure has multiple advantages as a body repair composition. Typically and advantageously, the composition according to present disclosure quickly develops adhesion to a surface (e.g., aluminum, galvanized steel, composite, E-coats, primers, and paints) to which it is applied. The cured composition according to the present disclosure at least one of provides better adhesion to a surface, provides better corrosion resistance to a surface, or is more easily sanded than a comparative composition, wherein the comparative cured composition is the same as the cured composition except the in the comparative cured composition the unsaturated polyester resin is not reacted with the compound represented by formula $(HD)_{1-4}$-R Similarly, in the method according to the present disclosure the composition at least one of provides better adhesion to a surface, provides better corrosion resistance to a surface, or is more easily sanded than a comparative composition, wherein the comparative cured composition is the same as the cured composition except that it does not include the compound represented by formula $(HD)_{1-4}$-R. As shown in Table 1 in the examples, below, the addition of the compound of formula $(HD)_{1-4}$-R reduces the gel time of the resin to which it is added. Also, as shown in Table 3 in the examples, below, the addition of the compound of formula $(HD)_{1-4}$-R leads to higher adhesion, better corrosion resistance, and easier sanding after only 12 minutes of cure time.

Some Embodiments of the Disclosure

In a first embodiment, the present disclosure provides a composition comprising:

a polymeric resin comprising at least one $\alpha,\beta$-unsaturated ester group;

a vinyl aromatic compound comprising at least one vinyl substituent on an aromatic ring; and an amino- or mercapto-substituted compound represented by formula $(HD)_{1-4}$-R, wherein each D is independently —S— or —N(H)— and R is a monovalent alkyl, alkenyl, or polyalkyleneoxy or a multivalent alkylene, alkenylene, or polyalkyleneoxy, wherein the alkyl, alkenyl, alkylene, or alkenylene are each interrupted by at least two —O—, —N(H)—, —N(H)—C(O)—, —S—C(O)—, or —O—C(O)— groups or a combination thereof.

In a second embodiment, the present disclosure provides the composition of the first embodiment, wherein the polymeric resin comprises a dicyclopentadiene-modified unsaturated polyester resin.

In a third embodiment, the present disclosure provides the composition of the second embodiment, wherein the polymeric resin comprises a dicyclopentenyl-end-capped unsaturated polyester resin.

In a fourth embodiment, the present disclosure provides the composition of any one of the first to third embodiments, wherein the polymeric resin comprises an unsaturated polyester resin, wherein the at least one $\alpha,\beta$-unsaturated ester group comprises an internal olefin. (This unsaturated polyester resin need not be a dicyclopentadiene-modified unsaturated polyester resin).

In a fifth embodiment, the present disclosure provides the composition of any one of the first to fourth embodiments, wherein the polymeric resin comprises an epoxy vinyl ester resin.

In a sixth embodiment, the present disclosure provides a composition comprising:

an epoxy vinyl ester resin;

a vinyl aromatic compound comprising at least one vinyl substituent on an aromatic ring; and an amino- or mercapto-substituted compound represented by formula $(HD)_{1-4}$-R, wherein each D is independently —S— or —N(H)— and R is a monovalent alkyl, alkenyl, polyalkyleneoxy or a multivalent alkylene, alkenylene, or polyalkyleneoxy, wherein the alkyl, alkenyl, alkylene, or alkenylene are each interrupted by at least two —O—, —N(H)—, —N(H)—C(O)—, —S—C(O)—, or —O—C(O)— groups or a combination thereof.

In a seventh embodiment, the present disclosure provides the composition of any one of the first to sixth embodiments, wherein the amino- or mercapto-substituted compound is represented by formula HD-$R^1$-Q-$R^2$, wherein D is —S— or —N(H)—, $R^1$ is alkylene that is interrupted by at least one —N(H)— or —O—; Q is —N(H)—C(O)—, —S—C(O)—, or —O—C(O)—; and $R^2$ is alkyl or alkenyl.

In an eighth embodiment, the present disclosure provide the composition of the seventh embodiment, wherein D is —N(H)—, $R^1$ is alkylene that is interrupted by at least one —N(H)— or —O—; Q is —N(H)—C(O)— or —O—C(O)—; and $R^2$ is alkyl or alkenyl having from 8 to 14 carbon atoms.

In a ninth embodiment, the present disclosure provides the composition of any one of the first to eighth embodiments, wherein the amino- or mercapto-substituted compound is $H_2N(CH_2CH_2NH)_4C(O)(CH_2)_7C(H)=C(H)—(CH_2)_3CH_3$.

In a tenth embodiment, the present disclosure provides the composition of any one of the first to eighth embodiments, wherein the amino- or mercapto-substituted compound is not $H_2N(CH_2CH_2NH)_4C(O)(CH_2)_7C(H)=C(H)—(CH_2)_3CH_3$.

In an eleventh embodiment, the present disclosure provides the composition of any one of the first to tenth embodiments, wherein the amino- or mercapto-substituted compound represented by formula $(HD)_{2-4}$-R, wherein each D is independently —S— or —N(H)— and R is multivalent alkylene, alkenylene, or polyalkyleneoxy, wherein alkylene and alkenylene are interrupted by at least two —O—, —N(H)—, —N(H)—C(O)—, —S—C(O)—, or —O—C(O)— groups or a combination thereof.

In a twelfth embodiment, the present disclosure provides a composition comprising:

a polymeric resin comprising at least one $\alpha,\beta$-unsaturated ester group;

a vinyl aromatic compound comprising at least one vinyl substituent on an aromatic ring; and an amino- or mercapto-substituted compound represented by formula $(HD)_{2-4}$-R, wherein each D is independently —S— or —N(H)— and R is multivalent alkylene, alkenylene, or polyalkyleneoxy, wherein alkylene and alkenylene are each interrupted by at least two —O—, —N(H)—, —N(H)—C(O)—, —S—C(O)—, or —O—C(O)— groups or a combination thereof.

In a thirteenth embodiment, the present disclosure provides the composition of the twelfth embodiment, wherein the polymeric resin comprises a dicyclopentadiene-modified unsaturated polyester resin.

In a fourteenth embodiment, the present disclosure provides the composition of the thirteenth embodiment, wherein the polymeric resin comprises a dicyclopentenyl-end-capped unsaturated polyester resin.

In a fifteenth embodiment, the present disclosure provides the composition of any one of the twelfth to fourteenth embodiments, wherein the polymeric resin comprises an unsaturated polyester resin. (That is, it is not a dicyclopentadiene-modified unsaturated polyester resin).

In a sixteenth embodiment, the present disclosure provides the composition of any one of the twelfth to fifteenth embodiments, wherein the polymeric resin comprises an epoxy vinyl ester resin.

In a seventeenth embodiment, the present disclosure provides the composition of any one of the eleventh to sixteenth embodiments, wherein the amino- or mercapto-substituted compound is represented by formula $(HD)_{2-4}$-R, wherein each D is independently —S— or —N(H)— and R is multivalent polyalkyleneoxy or alkylene that is interrupted by at least two —O—, —N(H)—, or —O—C(O)— groups or a combination thereof.

In an eighteenth embodiment, the present disclosure provides the composition of the seventeenth embodiment, wherein the amino- or mercapto-substituted compound is a polyetherdiamine having a molecular weight of at least 1000 grams per mole.

In a nineteenth embodiment, the present disclosure provides the composition of any one of the first to eighteenth embodiments, wherein the vinyl aromatic compound is styrene.

In a twentieth embodiment, the present disclosure provides the composition of any one of the first to nineteenth embodiments, further comprising a tertiary amine accelerator.

In a twenty-first embodiment, the present disclosure provides the composition of any one of the first to twentieth embodiments, further comprising at least one of ceramic beads, polymer beads, silica, hollow ceramic elements, hollow polymeric elements, alumina, zirconia, mica, dolomite, wollastonite, fibers, talc, calcium carbonate, or clay.

In a twenty-second embodiment, the present disclosure provides the composition of any one of the first to twenty-first embodiments, packaged as a two-part body repair composition, wherein a first part comprises the composition and a second part comprises a free-radical initiator.

In a twenty-third embodiment, the present disclosure provides the composition of the twenty-second embodiment, wherein the free-radical initiator comprises at least one of an organic peroxide or organic hydroperoxide.

In a twenty-fourth embodiment, the present disclosure provides a method of repairing a damaged surface, the method comprising:

combining the composition of any one of the first to twenty-second embodiments with at least one of an organic peroxide or organic hydroperoxide;

applying the composition comprising the organic peroxide or organic hydroperoxide to the damaged surface; and curing the composition on the damaged surface.

In a twenty-fifth embodiment, the present disclosure provides the method of the twenty-fourth embodiment, wherein the damaged surface is on at least a portion of a vehicle.

In a twenty-sixth embodiment, the present disclosure provides the method of the twenty-fourth or twenty-fifth embodiment, wherein curing is carried out at room temperature.

In a twenty-seventh embodiment, the present disclosure provides a cured composition prepared from the composition of any one of the first to twenty-third embodiments or prepared by the method of any one of the twenty-fourth to twenty-sixth embodiments.

In a twenty-eighth embodiment, the present disclosure provides an article comprising a cured composition on a surface, the cured composition comprising an polyester crosslinked with a vinyl aromatic compound comprising at least one vinyl substituent on an aromatic ring and covalently bonded to a group R through a —S— or —NH— group, wherein R is a monovalent alkyl, alkenyl, or polyalkyleneoxy or a multivalent alkylene, alkenylene, or polyalkyleneoxy, wherein the alkyl, alkenyl, alkylene, or alkenylene are each interrupted by at least two —O—, —N(H)—, —N(H)—C(O)—, —S—C(O)—, or —O—C(O)— groups or a combination thereof.

In a twenty-ninth embodiment, the present disclosure provides an article comprising a cured composition on a surface, the cured composition comprising an polyester crosslinked with a vinyl aromatic compound comprising at least one vinyl substituent on an aromatic ring and reacted with an amino- or mercapto-substituted compound represented by formula $(HD)_{1-4}$-R, wherein each D is independently —S— or —N(H)— and R is a monovalent alkyl, alkenyl, or polyalkyleneoxy or a multivalent alkylene, alkenylene, or polyalkyleneoxy, wherein the alkyl, alkenyl, alkylene, or alkenylene are each interrupted by at least two —O—, —N(H)—, —N(H)—C(O)—, —S—C(O)—, or —O—C(O)— groups or a combination thereof.

In a thirtieth embodiment, the present disclosure provides the article of the twenty-eighth or twenty-ninth embodiment, wherein the polyester comprises a dicyclopentadiene-modified unsaturated polyester.

In a thirty-first embodiment, the present disclosure provides the article of the thirtieth embodiment, wherein the polyester comprises a dicyclopentenyl-end-capped unsaturated polyester.

In a thirty-second embodiment, the present disclosure provides the article of any one of the twenty-eighth to thirty-first embodiments, wherein the polyester comprises an unsaturated polyester resin, wherein the at least one α,β-unsaturated ester group comprises an internal olefin. (This unsaturated polyester resin need not be a dicyclopentadiene-modified unsaturated polyester resin).

In a thirty-third embodiment, the present disclosure provides the article of any one of the twenty-eighth to thirty-second embodiments, wherein the polyester comprises an epoxy vinyl ester.

In a thirty-fourth embodiment, the present disclosure provides the article of any one of the twenty-eighth to thirty-second embodiments, wherein the amino- or mercapto-substituted compound is represented by formula HD-$R^1$-Q-$R^2$, wherein D is —S— or —N(H)—, $R^1$ is alkylene that is interrupted by at least one —N(H)— or —O—; Q is —N(H)—C(O)—, —S—C(O)—, or —O—C(O)—; and $R^2$ is alkyl or alkenyl.

In a thirty-fifth embodiment, the present disclosure provide the article of the thirty-fourth embodiment, wherein D is —N(H)—, $R^1$ is alkylene that is interrupted by at least one —N(H)— or —O—; Q is —N(H)—C(O)— or —O—C(O)—; and $R^2$ is alkyl or alkenyl having from 8 to 14 carbon atoms.

In a thirty-sixth embodiment, the present disclosure provides the article of any one of the twenty-eighth to thirty-fifth embodiments, wherein the amino- or mercapto-substituted compound is $H_2N(CH_2CH_2NH)_4C(O)(CH_2)_7C(H)=C(H)-(CH_2)_3CH_3$.

In a thirty-seventh embodiment, the present disclosure provides the article of any one of the twenty-eighth to thirty-fifth embodiments, wherein the amino- or mercapto-substituted compound is not $H_2N(CH_2CH_2NH)_4C(O)(CH_2)_7 C(H)=C(H)-(CH_2)_3CH_3$.

In a thirty-eighth embodiment, the present disclosure provides the article of any one of the twenty-eighth to thirty-seventh embodiments, wherein the amino- or mercapto-substituted compound represented by formula $(HD)_{2-4}$-R, wherein each D is independently —S— or —N(H)— and R is multivalent polyalkyleneoxy or multivalent alkylene or alkenylene each of which is interrupted by at least two —O—, —N(H)—, —N(H)—C(O)—, —S—C(O)—, or —O—C(O)— groups or a combination thereof.

In a thirty-ninth embodiment, the present disclosure provides the article of the thirty-eighth embodiment, wherein the amino- or mercapto-substituted compound is represented by formula $(HD)_{2-4}$-R, wherein each D is independently —S— or —N(H)— and R is multivalent polyalkyleneoxy or multivalent alkylene that is interrupted by at least two —O—, —N(H)—, or —O—C(O)— groups or a combination thereof.

In fortieth embodiment, the present disclosure provides the article of the thirty-ninth embodiment, wherein the amino- or mercapto-substituted compound is a polyetherdiamine having a molecular weight of at least 1000 grams per mole.

In a forty-first embodiment, the present disclosure provides the article of any one of the twenty-eighth to fortieth embodiments, wherein the vinyl aromatic compound is styrene.

In a forty-second embodiment, the present disclosure provides the article of any one of the twenty-eighth to forty-first embodiments, wherein the cured composition further comprises at least one of ceramic beads, polymer beads, silica, hollow ceramic elements, hollow polymeric elements, alumina, zirconia, mica, dolomite, wollastonite, fibers, talc, calcium carbonate, or clay.

In a forty-third embodiment, the present disclosure provides the article of any one of the twenty-eighth to forty-second embodiments, wherein the article is a portion of a vehicle.

In a forty-fourth embodiment, the present disclosure provides the method or article of any one of the twenty-fourth to forty-third embodiments, wherein the cured composition has better adhesion to the surface than a comparative composition, wherein the comparative cured composition is the same as the cured composition except the in the comparative cured composition the polyester is not reacted with the compound represented by formula $(HD)_{2-4}$-R.

In a forty-fifth embodiment, the present disclosure provides the method or article of any one of the twenty-fourth to forty-fourth embodiments, wherein the cured composition is removed more easily by sanding after curing for 12 minutes than a comparative composition, wherein the comparative cured composition is the same as the cured composition except the in the comparative cured composition the polyester is not reacted with the compound represented by formula $(HD)_{2-4}$-R.

In a forty-sixth embodiment, the present disclosure provides the method or article of any one of the twenty-fourth to forty-fifth embodiments, wherein the cured composition has better corrosion resistance than a comparative composition, wherein the comparative cured composition is the same as the cured composition except the in the comparative cured composition the polyester is not reacted with the compound represented by formula $(HD)_{2-4}$-R.

In order that this disclosure can be more fully understood, the following examples are set forth. It should be understood that these examples are for illustrative purposes only, and are not to be construed as limiting this disclosure in any manner.

EXAMPLES

The following abbreviations are used to describe the examples: ° C.=degrees Centigrade, kPa=kilopascal, mm=millimeter, psi=pounds per square inch, and wt. %=weight percent.

Unless stated otherwise, all reagents were obtained or are available from chemical vendors such as Sigma-Aldrich Company, St. Louis, Mo., or may be synthesized by known methods. Unless otherwise reported, all ratios are by dry weight.

Abbreviations for materials and reagents used in the examples are as follows:

AC: An amide, obtained under the trade designation "AMERIBOND E-102" from Ameritech Corporation, Marietta, Ga., having the structural formula $H_2N(CH_2CH_2NH)_4C(O)(CH_2)_7C(H)=C(H)-(CH_2)_3CH_3$.

AS: Amorphous silica, obtained under the trade designation "ZEOTHIX 265" from Huber Engineered Materials, Overland Park, Kans.

BPO: A blue dyed, 50 wt. % benzoyl peroxide paste, obtained from Raichem, s.r.l., Reggio Emilia, Italy.

D2K: Polyetheramine, obtained under the trade designation "D2000" from BASF Corporation, Florham Park, N.J.

DCPD: Dicyclopentenyl-end-capped polyester resin obtained under the trade designation "739-8734-4.5" from Polynt Composites, USA, Inc., North Kansas City, Mo. The resin is reported to include 29% to 30% by weight styrene.

GB: Glass bubbles, obtained under the trade designation "S-22" from 3M Company. St. Paul, Minn.

Talc: Talc, obtained under the trade designation "GRADE AB" from Luzenac America, Inc., Centennial, Colo.

$TiO_2$: Titanium dioxide, obtained under the trade designation "KRONOS 2310" from Kronos Worldwide, Inc., Dallas, Tex.

TDEA: N-(p-tolyl)diethanolamine, obtained from BASF Corporation, Florham Park, N.J.

PPR: A promoted, low reactive, polyester resin, obtained under the trade designation "32367-00" from Reichhold LLC, Durham, N.C. The resin is reported to include 35% by weight styrene.

PW: Paraffin wax, having a melting point of 125° F.-130° F., obtained under the trade designation "60-0254" from Frank B. Ross Co., Ins., Rahway, N.J.

UPR: An un-promoted, low reactive, polyester resin, obtained under the trade designation "31016-00" from Reichhold LLC. The resin is reported to include 35% by weight styrene.

VE: Corrosion-Resistant Vinyl Ester Resin obtained from Polynt Composites, USA, under the trade designation "789-8710". The resin is reported to include 40% by weight styrene.

Comparative A 30 grams UPR and 1.2 grams BPO were manually mixed at 25° C. in a 6-oz. (170 gram) screw-cap plastic container until homogeneous, and the gel time recorded.

Example 1

The procedure generally described in Comparative A was repeated, wherein 0.96 grams AC was homogeneously mixed into the UPR before the addition of BPO.

Comparative B

The procedure generally described in Comparative A was repeated, wherein the 30 grams UPR was substituted with an equal weight of PPR.

Example 2

The procedure generally described in Example 1 was repeated, wherein the wherein the 30 grams UPR was substituted with an equal weight of PPR.

Comparative C

The procedure generally described in Comparative A was repeated, wherein the 30 grams UPR was substituted with an equal weight of DCPD.

Example 3

The procedure generally described in Comparative C was repeated, wherein 0.32 grams AC was homogeneously mixed into the DCPD before the addition of BPO.

Example 4

The procedure generally described in Example 3 was repeated, wherein 0.96 grams AC was homogeneously mixed into the DCPD before the addition of BPO.

Comparative D

The procedure generally described in Comparative C was repeated.

Example 5

The procedure generally described in Example 4 was repeated, wherein the 0.96 grams AC was substituted by an equal amount of D2K.

Comparative E

The procedure generally described in Comparative A was repeated, wherein 0.32 grams TDEA was homogeneously mixed into the UPR before the addition of BPO.

Comparative F

The procedure generally described in Comparative A was repeated, wherein the 30 grams UPR was substituted with an equal weight of VE.

Example 6

The procedure generally described in Comparative F was repeated, wherein 0.32 grams AC was homogeneously mixed into the VE before the addition of BPO.

Example 7

The procedure generally described in Example 6 was repeated, wherein 0.96 grams AC was homogeneously mixed into the VE before the addition of BPO.

Gel times are reported in Table 1.

TABLE 1

| Composition | Gel Time (Seconds) |
|---|---|
| Comparative A | Did not gel |
| Example 1 | 3,540 |
| Comparative B | 176 |
| Example 2 | 135 |
| Comparative C | 9,000 |
| Example 3 | 149 |
| Example 4 | 57 |
| Comparative D | 9,000 |
| Example 5 | 3,600 |
| Comparative E | 250 |
| Comparative F | 9,000 |
| Example 6 | 175 |
| Example 7 | 74 |

Comparative G (C.E. G)

57.0 grams UPR was added to a 250 mL screw-cap plastic container at 25° C. 2.00 grams $TiO_2$ was blended into the UPR until homogeneous by means of a high speed mixer. 1.50 grams AS, 33.0 grams Talc, 0.4 grams PW and 6.1 grams GB were sequentially added, each component manually mixed into the composition until homogeneous before the next component.

Examples 8 to 11 (Ex. 8 to 11) and Comparative Examples H and I (C.E. H & I)

The procedure generally described in Comparative G was repeated, according to the compositions listed in Table 2.

TABLE 2

| | Composition (wt. %) | | | | | | |
|---|---|---|---|---|---|---|---|
| Component | C.E. G | Ex. 8 | Ex. 9 | Ex. 10 | Ex. 11 | C.E. H | C.E. I |
| UPR | 57.0 | 56.0 | 0 | 0 | 0 | 0 | 0 |
| DCPD | 0 | 0 | 56.0 | 56.0 | 57.0 | 57.0 | 0 |
| VE | 0 | 0 | 0 | 0 | 0 | 0 | 57.0 |
| AC | 0 | 3.0 | 0 | 3.0 | 1.0 | 0 | 0 |
| D2K | 0 | 0 | 3.0 | 0 | 0 | 0 | 0 |
| TDEA | 0 | 0.3 | 0.3 | 0.2 | 0.3 | 0.3 | 0.3 |
| $TiO_2$ | 2.0 | 1.0 | 1.0 | 1.2 | 1.2 | 2 | 2 |
| AS | 1.5 | 1.2 | 1.2 | 1.2 | 1.2 | 1.2 | 1.2 |
| Talc | 33.0 | 32.0 | 32.0 | 32.0 | 33.0 | 33.0 | 33.0 |
| PW | 0.4 | 0.5 | 0.5 | 0.4 | 0.4 | 0.5 | 0.5 |
| GB | 6.1 | 6.0 | 6.0 | 6.0 | 6.0 | 6.0 | 6.0 |

Evaluations

The following evaluations were performed on the Compositions of Comparative F and Examples 6 to 9 after they were each mixed with 2% by weight BPO and cured. The results of the evaluations are listed in Table 3:

Salt Spray Corrosion
According to ASTM B117.

Lap Shear
Lap Shear evaluations were carried out on steel substrates according to ASTM D1002.

Adhesion by Tape Test
According to ASTM D3359-02-B, wherein the filler is cured for 24 hours at 25° C., immersed in a water bath for 7 days at 40° C., after which the cross-cut lattice comprises a 10 by 10 matrix of cured filler segments.

Sanding Tests
A 210 by 100 mm stainless steel panel was manually sanded with an 80 grit sandpaper to provide a rough surface. 100 grams of the filler composition was thoroughly mixed with 2 grams BPO at 21° C. and applied to the sanded steel panel. The mass of panel and cured filler was then measured. After curing for 12 minutes at 21° C., the sample was sanded with 80 grit sandpaper for 30 seconds by means of a dual action sander, after which the panel was reweighed and the amount of filler removed was determined. After another 8 minutes, the sample was again sanded and the additional amount of filler recorded. The results reported in Table 3 represent the average of 4 sanding tests per sample.

TABLE 3

| Sample | Salt Spray Corrosion | Lap Shear (psi/kPa) | Cross-Cut Adhesion (Sections Retained) | Sanding (grams) @ 12 mins. | Sanding (grams) @ 20 mins. |
|---|---|---|---|---|---|
| Comparative G | Rusted | 750/5,171 | 0 | 1.9 | 2.0 |
| Example 8 | Partially rusted | 850/5,861 | 45 | 2.8 | 1.9 |
| Example 9 | No Rust | 1,010/6,964 | 75 | 3.1 | 2.0 |
| Example 10 | No Rust | 1,150/7,929 | 100 | 4.1 | 2.5 |
| Example 11 | No Rust | 1,100/7,584 | 100 | 4.0 | 2.4 |
| Comparative H | Starting to rust | 900/6,205 | 70 | 3.0 | 2.0 |
| Comparative I | No Rust | 920/6,343 | 76 | 2.9 | 1.9 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A composition comprising:
   a polymeric resin comprising at least one α,β-unsaturated ester group;
   a vinyl aromatic compound comprising at least one vinyl substituent on an aromatic ring; and
   a compound represented by formula $HD-R^1-Q-R^2$, wherein D is —S— or —N(H)—; $R^1$ is alkylene that is interrupted by at least one —O— or —N(H)—; Q is —N(H)—C(O)—, —S—C(O)—, or —O—C(O)—; and $R^2$ is alkyl or alkenyl.

2. The composition of claim 1, wherein the polymeric resin comprises a dicyclopentadiene-modified unsaturated polyester resin.

3. The composition of claim 2, wherein the polymeric resin comprises a dicyclopentadiene-end-capped unsaturated polyester resin.

4. The composition of claim 2, wherein the polymeric resin comprises an unsaturated polyester resin, wherein the at least one α,β-unsaturated ester group comprises an internal olefin.

5. The composition of claim 1, wherein the polymeric resin comprises an epoxy vinyl ester resin.

6. The composition of claim 1, wherein the compound represented by formula $HD-R^1-Q-R^2$ is $H_2N(CH_2CH_2NH)_4C(O)(CH_2)_7C(H)=C(H)-(CH_2)_3CH_3$.

7. The composition of claim 1, wherein the vinyl aromatic compound is styrene.

8. The composition of claim 1, further comprising a tertiary amine accelerator.

9. The composition of claim 1, further comprising at least one of ceramic beads, polymer beads, silica, hollow ceramic elements, hollow polymeric elements, alumina, zirconia, mica, dolomite, wollastonite, fibers, talc, calcium carbonate, or clay.

10. The composition of claim 1, packaged as a two-part body repair composition, wherein a first part comprises the composition, and a second part comprises an organic peroxide or organic hydroperoxide.

11. A method of repairing a damaged surface, the method comprising:
    combining the composition of claim 1 with at least one of an organic peroxide or an organic hydroperoxide;
    applying the composition comprising at least one of the organic peroxide or the organic hydroperoxide to the damaged surface; and
    curing the composition on the damaged surface to provide a cured composition.

12. The method of claim 11, wherein the damaged surface is on at least a portion of a vehicle.

13. The method of claim 11, wherein curing is carried out at room temperature.

14. The method of claim 11, wherein the compound represented by formula $HD-R^1-Q-R^2$ is $H_2N(CH_2CH_2NH)_4C(O)(CH_2)_7C(H)=C(H)-(CH_2)_3CH_3$.

15. The method of claim 11, further comprising sanding the cured composition.

16. The method of claim 11, wherein the composition further comprises at least one of ceramic beads, polymer beads, silica, hollow ceramic elements, hollow polymeric elements, alumina, zirconia, mica, dolomite, wollastonite, fibers, talc, calcium carbonate, or clay.

17. An article comprising a cured composition on a surface, the cured composition comprising an polyester crosslinked with a vinyl aromatic compound comprising at least one vinyl substituent on an aromatic ring and reacted with a compound represented by formula $HD-R^1-Q-R^2$, wherein D is —S— or —N(H)—; $R^1$ is alkylene that is interrupted by at least one —O— or —N(H)—; Q is —N(H)—C(O)—, —S—C(O)—, or —O—C(O)—; and $R^2$ is alkyl or alkenyl.

18. The article of claim 17, wherein the cured composition further comprises at least one of ceramic beads, polymer beads, silica, hollow ceramic elements, hollow polymeric elements, alumina, zirconia, mica, dolomite, wollastonite, fibers, talc, calcium carbonate, or clay.

19. The article of claim 17, wherein the article is a portion of a vehicle.

* * * * *